PULSE MODULATION COMMUNICATION SYSTEM

Filed May 18, 1962 4 Sheets-Sheet 1

JAMES R. RANSOM
MERLIN E. OLMSTEAD
INVENTORS

BY Hillman, Smith & Lamb
ATTORNEYS

PULSE MODULATION COMMUNICATION SYSTEM

Filed May 18, 1962 4 Sheets-Sheet 2

JAMES R. RANSOM
MERLIN E. OLMSTEAD
INVENTORS

BY Killman, Smith & Lamb
ATTORNEYS

PULSE MODULATION COMMUNICATION SYSTEM

Filed May 18, 1962 4 Sheets-Sheet 3

JAMES R. RANSOM
MERLIN E. OLMSTEAD
INVENTORS

BY Killman, Smith & Lamb
ATTORNEYS

PULSE MODULATION COMMUNICATION SYSTEM

Filed May 18, 1962 4 Sheets-Sheet 4

JAMES R. RANSOM
MERLIN E. OLMSTEAD
INVENTORS

BY Killman, Smith & Lamb
ATTORNEYS

United States Patent Office 3,176,225

Patented Mar. 30, 1965

3,176,225

PULSE MODULATION COMMUNICATION SYSTEM

James R. Ransom and Merlin E. Olmstead, Baltimore, Md., assignors to The Bendix Corporation, Baltimore, Md., a corporation of Delaware Filed May 18, 1962, Ser. No. 195,731
7 Claims. (Cl. 325—38)

The present invention relates in general to communication systems and in particular to a system of the asynchronous pulse modulation type.

Pulse modulation communication systems can be employed for the purpose of sending a number of signals over a single transmission line or radio link. The signals may convey information in various forms, such as voice, telegraph, television and facsimile simultaneously through a single link with acceptable accuracy provided suitable equipment and adequate bandwidth is available. The present invention is disclosed as a means for multiplexing or transmitting simultaneously on a single communications link a plurality of voice signals. It should be understood, however, that the principles of the invention embrace the transmission of signals of other forms, limited only by the bandwidth of available frequencies.

The synchronous pulse amplitude modulation (PAM) system transmits information by amplitude modulating a carrier with a signal wave in the form of narrow rectangular pulses of constant repetition rate. The amplitude of the pulses varies in proportion to the amplitude of the input signal, while the repetition rate is governed by the maximum signal frequency to be transmitted. It has been proven that a pulse rate twice as great as the maximum signal frequency is adequate to transmit all signal frequency components up to the maximum. Thus if a complex signal having frequency components up to 4000 c.p.s. is to be transmitted, a pulse or sampling rate of 8000 c.p.s. is the minimum rate which will permit faithful reproduction of the transmitted signal at the receiving station. The pulses are preferably of very short duration, but this factor is generally limited by the carrier channel bandwidth. Merely for illustration, assume that it is possible to transmit in a given channel, pulses of one microsecond duration at a rate of 8000 pulses per second. Then the carrier would appear to be inactive for 124 microseconds following the transmission of each signal pulse. By synchronizing transmitting and receiving stations to operate only at a particular time relative to other stations, simple theory would indicate that as many as 125 messages could be transmitted simultaneously over the same band of carrier frequencies. Numerous practical considerations frustrate operation of a circuit to maximum capacity. The precise synchronization of the stations does not leave any room for timing variation as might be introduced by the varying time for a message to travel between a fixed and a mobile station. Even the constant transit time delays involved in a network of scattered fixed stations reduce the message capacity of the carrier channel. Further, because it is to be expected that noise will cause some pulses to be missing or to be in error, the pulse rate is generally made higher than the theoretical minimum, causing a further reduction in system capacity. The duty cycle of the stations is another factor to consider when the object is to extract the maximum utility from a given channel. Returning to the 125 transmitter network first assumed, it is to be expected that not every station will be transmitting continuously. Perhaps only 100 of the number might be operating at any particular time, thus allowing an additional 25 stations to be crowded into the channel. It is clear, however, that the stations cannot then be assigned fixed time spots in the channel because the idle times are moving about amongst the 125 original occupants in a random manner. Though the switching and synchronization problems are formidable, systems have been developed which make use of idle transmitter time in order to increase the population of stations in a network.

Amongst the progeny of synchronous pulse amplitude modulation systems are those employing pulse code modulation (PCM), pulse frequency modulation (PFM), and pulse position modulation (PPM), oftentimes referred to as pulse time modulation (PTM), all of which convey information as to the signal amplitude in some form other than by direct proportion of the pulse amplitude. For example, the signal may be quantized, that is, the signal may be sampled at intervals and each sample assigned some numerical value which is relative to its amplitude. The quantized signal is then translated into a suitable pulse code, say binary, and transmitted as a series of pulses of constant amplitude. One advantage of the system is its comparative immunity to noise, but a price is paid in the necessity to transmit a plurality of pulses to represent a particular signal amplitude which before was accomplished with a single pulse.

In a pulse frequency modulation system, the signal may be sampled to provide pulses of varying amplitude which then are used to frequency modulate a carrier. A discriminator or similar frequency responsive detector at the receiving end then reconverts the varying carrier frequency of the pulses to pulse amplitude signals. The pulse time or pulse position modulation systems are similar to the pulse frequency modulation systems, except that the pulse repetition rate is varied rather than the carrier frequency.

Still another departure from synchronous pulse amplitude modulation systems are the asynchronous pulse modulation systems. The latter systems depend upon some form of pulse code for identifying the addressee and may employ any of the noted forms of pulse modulation for conveying signal information. For example, one pair of stations may transmit and respond to signals composed only of pairs of pulses spaced by two microseconds, while another pair of stations may communicate with messages formed solely of groups of pulses comprised of three pulses spaced one microsecond apart. Alternatively, addresses may be formed numerically with the modulation being present in the form of a carrier frequency shift (PFM) or pulse repetition rate shift (PPM).

The asynchronous pulse modulation methods have two cardinal advantages over the synchronous methods. First, they are readily adaptable to networks having mobile stations or otherwise situate so that the message transit time is an important factor in setting up a synchronous system. Second, they permit crowding a channel with a number of low duty-cycle stations without requiring any of the elaborate switching systems necessary for such operation in a synchronous system.

Asynchronous systems are occasionally troubled by interference resulting from signals which combine randomly to produce the address code of a particular station. This may result in the reception at that station of a spurious sample or it may cause the obstruction of a genuine sample. At any event, existing theory provides reasonable guides as to the optimum population of a network of given characteristics to produce signals of specified intelligibility. It is unnecessary to consider such theory in detail to gain an understanding of the present invention. One factor which theory considers, however, is the redundancy of the message sources. For certain situations a mathematical value may be ascribed to the factor. Without attempting to fix a mathematical value for the redundancy but merely to indicate its nature, consider what may be a typical asynchronous pulse frequency modulation system. Let the station address be composed of a pulse group consisting of three pulses spaced one microsecond apart. The sending station would sample the signal at a rate of perhaps eight kc./s. producing a series of pulses whose amplitudes correspond to the amplitudes of the signal samples. The pulses then cause a carrier oscillator to deviate from its center frequency in correspondence with the amplitude of the pulse samples. Simultaneously with the sampling pulses, a circuit keys the transmitter to produce the sequence of pulses identifying the addressee. The message transmitted then consists of groups of three pulses with each group spaced at 125 microsecond intervals. The receiving station recognizes its address from the three properly spaced pulses, but only the first of these pulses is necessary to convey to the receiver information of the sample amplitude. The remaining two pulses are redundant so far as message information content is concerned. Redundancy is not entirely wasteful because it decreases uncertainties in messages. Just as in conversation, noisy conditions may make it necessary to repeat a word several times, redundancy of electrical signals serves to overcome disturbances due to noise. But where noise levels are tolerable, redundancy diminishes the information handling capacity of the system.

It is, therefore, the principal object of the present invention to increase the capacity of communication systems by providing means for reducing the redundancy therein.

Another object of the invention is to provide a multiplex communication system of increased capacity which is readily adapted to use by mobile stations.

A further object is to provide a multiplex communication system of the asynchronous type which is comparatively immune to interference from other stations inhabiting the same channel.

Still another object of the invention is to provide a communications system in which a plurality of stations occupying a common channel may selectively communicate with one another simultaneously.

These and other objects and advantages will be evident as the invention becomes better understood through study of the following detailed description and accompanying drawings, wherein.

Figure 1:
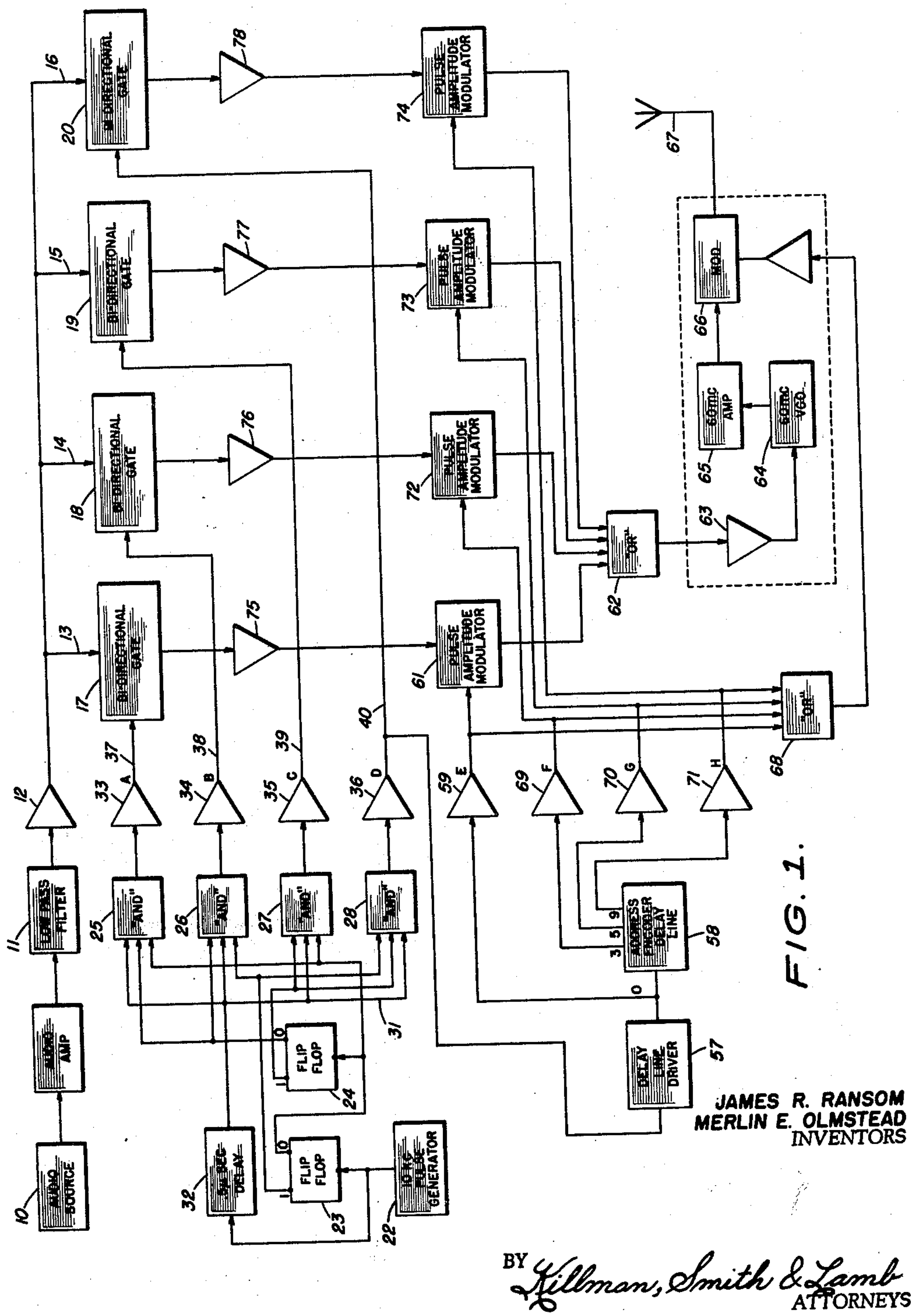
FIG. 1 is a functional block diagram of a transmitter operating in accordance with the invention.

FIG. 1 illustrates a transmitter for a radio voice communications system embodying the principles of the invention. The output of an audio source 10, usually comprised by a microphone, is amplified and supplied to a low pass filter 11 which attenuates the higher frequency components of speech. The output of filter 11 is passed through an isolation amplifier 12, which may be a conventional cathode follower or emitter follower type circuit; thence to four parallel inputs 13–16 feeding four separate bidirectional gates 17–20. Gates 17–20 extract and store in order sequence samples from the continuous audio signal on input leads 13–16. The gates are termed bidirectional to indicate that samples of either positive or negative polarity may be stored, as would be required by an alternating input signal.

Figure 2A:
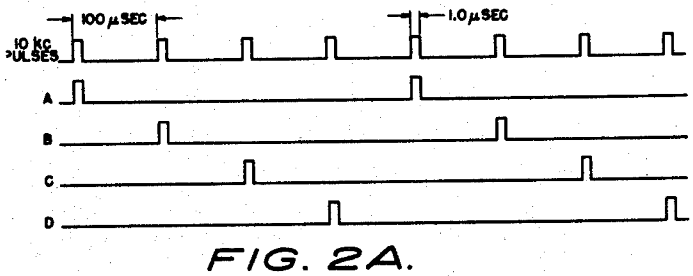
FIGS. 2A and 2B are waveform diagrams illustrating timing and coding operations of the transmitter of FIG. 1.
Figure 2B:
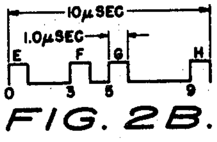

The audio signal is sampled at a rate of ten kc./s. The sequential samples are then arranged in groups of four, compressed in time, and transmitted with individual spacing corresponding to the address of the selected receiving station. Referring briefly to FIGS. 2A and 2B, the uppermost line of one microsecond pulses occurring at a ten kc./s. rate represents the frequency and duration of samples taken from the audio signal. The amplitude of these pulses is not significant as the audio signal has not yet been impressed thereon. Pulses on lines A, B, C and D occur at one-fourth the sampling rate, or at 400 microsecond intervals, and appear in alphabetical sequence. The pulses A–D each actuate one of the gates 17–20 (FIG. 1), permitting each gate to receive in sequence a one microsecond sample of the audio signal on lines 13–16. The gates store four samples so that they may subsequently supply signal amplitude information to the address coding circuits.

FIG. 2B illustrates a typical station address code. The four pulse group is contained within a ten microsecond span as determined by the constants of a tapped delay line at the transmitter. The use of adjacent delay line taps is precluded so that it is possible to encode only about thirty-five unique addresses using four pulses and a ten microsecond delay line. Longer delay lines, however, will permit the arrangement of many more unique address combinations, so that the small number of addresses in the disclosed embodiment should not be considered a limitation of the invention. As shown in FIG. 2B, a delay line tapped at intervals of zero, three, five and nine microseconds would generate a train of four pulses of corresponding time spacing when fed with a single input pulse. At the receiving station, a delay line provided with taps which are complementary to the taps of the transmitter delay line provides a means for recognizing the station address code. Thus, for the code illustrated, the receiver delay line would be tapped at ten, seven, five and one microsecond points.

Again referring to FIG. 1, a ten kc./s. pulse generator 22 provides the timing intervals represented by the uppermost line of pulses of FIG. 2A. These pulses are divided into groups corresponding to the pulses A–D of FIG. 2A by means of a counter comprised by flip-flops 23 and 24 and four "and" gates 25–28. The flip-flops each provide a "1" output line and a "0" output line and are triggered from one state to the other by the appearance of a pulse at a clock input terminal. The "1" line of flip-flop 23 is connected to gates 26 and 28, the "0" line thereof is connected to gates 25 and 27 and also supplies a triggering pulse to flip-flop 24. The "1" line of flip-flop 24 is connected to gates 27 and 28, while its "0" line is connected to gates 25 and 26.

Assuming initially that the "1" line of both flip-flops is "on" or "up," that is both flip-flops are in that state which provides a higher voltage level on the "1" line than on the "0" line, the first pulse to arrive from generator 22 will kick flip-flop 23 into the "zero" state. The "zero" output from flip-flop 23 triggers flip-flop 24 also to "zero." The first pulse from generator 22 has thus caused both flip-flops to change state. The second pulse from generator 22 triggers flip-flop 23 from "zero" to "one." Flip-flop 24 does not respond to the change since only an "up" condition on the "0" line of flip-flop 24 is effective as a trigger. At the end of the second pulse from generator 22, flip-flops 23 and 24 are respectively in a condition of "one" and "zero." With the flip-flops both initially in a "one" state, two inputs are present at "and" gate 28. Gate 28 is not enabled, however, because no input is present on a third input line 31. Line 31 provides a common input to all gates 25–28, thus disabling those gates until a pulse is present on the line. Line 31 receives pulses from generator 22 which have been delayed by one-half microsecond in a delay line 32. Since flip-flops 23 and 24 require a certain amount of time to change state, it is necessary to introduce the delay between the pulses from generator 22 and line 31, otherwise both that gate which is partially enabled by the initial condition of the flip-flops and that gate which is partially enabled by the succeeding condition of the flip-flops would be successively enabled for the duration of the pulse from generator 22. This would prevent a clear division by four and segregation of the pulses A–D, as desired.

The operation of the counter is summarized in the following table:

| | Flip-flop 23 | Flip-flop 24 | |
|---|---|---|---|
| Initial Condition | "1" | "1" | Gate 28 partially enabled, no output. |
| Pulse #1 | "0" | "0" | Gate 25 enabled 1µs. |
| Pulse #2 | "1" | "0" | Gate 26 enabled 1µs. |
| Pulse #3 | "0" | "1" | Gate 27 enabled 1µs. |
| Pulse #4 | "1" | "1" | Gate 28 enabled 1µs. |
| Pulse #5 | "0" | "0" | Gate 25 enabled 1µs. |
| and so on. | | | |

Isolation amplifiers 33–36 connected respectively to gates 25–28 provide, at their respective outputs 37–40, the pulses A–D of FIG. 2A. These are the pulses which enable the bidirectional gates 17–20 in proper sequence and which establish the timing and duration of samples taken from the audio signal to be transmitted.

Figure 3:
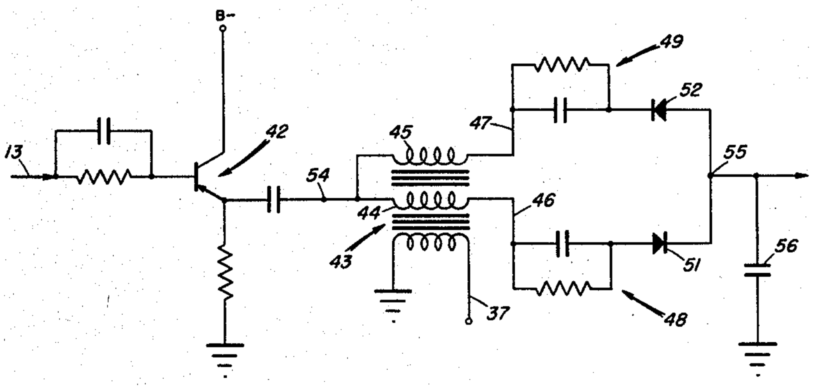
FIG. 3 is a schematic diagram of a storage gate used in both the receiver and transmitter.

FIG. 3 illustrates a typical bidirectional gate in detail. The audio signal to be sampled is present at the input 13 to an emitter follower amplifier 42. The enabling "A" pulses, occurring every 400 microseconds, are applied through lead 37 to the primary winding of a pulse transformer 43. Two secondary windings 44, 45 on transformer 43 are connected phase aiding, so that a pulse applied to the primary produces a positive pulse on lead 46 and a negative pulse on lead 47. Long time constant parallel resistor-capacitor filters 48, 49 and two diodes 51, 52 are connected to leads 46 and 47 forming a closed circuit with windings 44 and 45. Diodes 51 and 52 are so polarized that a pulse at input 37 causes both diodes to conduct and charge the capacitors of filters 48 and 49. The long time constant of these filters retains the charge so that upon termination of the input pulse, both diodes are backward biased. The backward biased diodes 51 and 52 present a very high impedance between the points 54 and 55. When the diodes are conductive, however, the impedance between those points drops to a very low value. A storage capacitor 56 connected between points 55 and ground will, therefore, rapidly charge to the voltage of point 54 during conduction of diodes 51 and 52 and will retain that charge as long as the diodes are nonconductive. Consequently, capacitor 56 is effectively connected to the low impedance output of amplifier 42 every 400 microseconds for a period of one microsecond in synchronism with the "A" pulses on line 37. During the one microsecond interval, capacitor 56 charges to the voltage level of the audio signal then prevailing. The charge is then retained for 400 microseconds, irrespective of intervening changes in the voltage of the audio signal pending the arrival of the next "A" pulse. Upon the arrival of the next "A" pulse, a new charge will be assumed according to the instantaneous value of the audio signal at that moment.

Again referring to FIG. 1, gates 18–20 are identical in construction and operation to gate 17, except that they are respectively synchronized with pulses B–D. Upon the generation of the four pulses A–D, there will therefore be stored in the capacitors of gates 17–20 four individual voltage levels corresponding to samples taken at 100 microsecond intervals from the audio signal to be transmitted. With the four audio samples now stored in gates 17–20, the system next functions to transmit, within an interval of ten microseconds, four pulses addressed to a selected station and modulated in accordance with the stored audio samples.

A D pulse appearing at the output of amplifier 36 signifies the availability of four samples for transmission.

Figure 5:
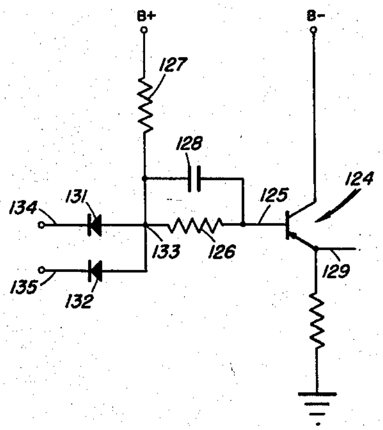
FIG. 5 is a schematic diagram of a pulse amplitude modulator used in the receiver of FIG. 4 and the transmitter of FIG. 1.

The D pulse is utilized for the generation of four pulses appropriately spaced within a ten microsecond interval by applying it, through a delay line driver 57 to a tapped delay line 58. The delay line 58 is tapped at intervals corresponding to the address of the selected station which, in the example of FIG. 2B, are at zero, three, five and nine microseconds. The first pulse E of the address code will, therefore, appear at the output of an isolation amplifier 59 immediately after the D pulse is applied to driver 57. The E pulse actuates a pulse amplitude modulator 61, later described with reference to FIG. 5, which produces a pulse having an amplitude which varies in accordance with the sample stored in gate 17. The pulse from modulator 61 passes through an "or" gate 62 and an amplifier 63, whence it is applied as a control voltage to a 60 mc./s. voltage controlled oscillator 64. The output of oscillator 64 is amplified in a power amplifier 65, pulse modulated and radiated as the signal carrier. Of course, the nominal frequency of oscillator 64 may be other than 60 mc./s. to suit whatever channel is chosen for system operation.

Oscillator 64 runs continuously and for a control pulse of a certain prescribed amplitude, say −3 volts, will oscillate at its center frequency of sixty mc./s. If the control pulse is of smaller magnitude, say −1 volt, oscillator 64 shifts frequency, say to 60.05 mc./s., or if the control pulse is of greater magnitude, say −5 volts, the oscillator will deviate from its sixty mc./s. center frequency in the opposite direction, say to 59.95 mc./s. The amplitude of the pulses from amplifier 63 thus causes frequency modulation of the output of amplifier 65. Since it is desired to transmit this output in the form of address coded pulses, a pulse modulator 66 blocks the output of amplifier 65 from the antenna 67 until keyed on in synchronism with the pulses E–H. The keying pulses are derived from the amplified output of an "or" gate 68 to which is applied the E pulse from isolation amplifier 59 and the F–H pulses from isolation amplifiers 69–71 connected to the taps on delay line 58.

Thus far it has been shown how the D pulse is used to generate the first pulse E of the address code group, how this pulse is amplitude modulated in accordance with the audio sample from gate 17 and finally transmitted as a frequency modulated pulse. The remaining pulses G–H of the address code group are generated and transmitted in an identical manner. Individual isolation amplifiers 69–71 and pulse amplitude modulators 72–74 maintain the identity of each of the pulses. As the D pulse progresses down delay line 58, pulse amplitude modulator 72 will first be enabled, next modulator 73 and finally modulator 74, transmitting pulses in the same order in which the samples stored in gates 18–20 were taken. To prevent modulators 61 and 72–74 from discharging the storage capacitors of gates 17–20, the modulators are separated from the gates by amplifiers 75–78 having a very high input impedance.

Within ten microseconds, four pulses representative of samples taken over an interval of 400 microseconds are transmitted. Therefore, the transmitter can vacate the channel for 390 microseconds to make room for others. After resting this period, four new audio samples will have been taken which are then rapidly transmitted in the foregoing manner.

It is the task of the receiver to recognize and respond to its address code while rejecting other pulse combinations; to extract amplitude information from the frequency modulation of the received pulses; to arrange and store the received pulses in proper sequence; and to expand the time base of the received pulses and reconstruct the original audio signal.

Figure 4:
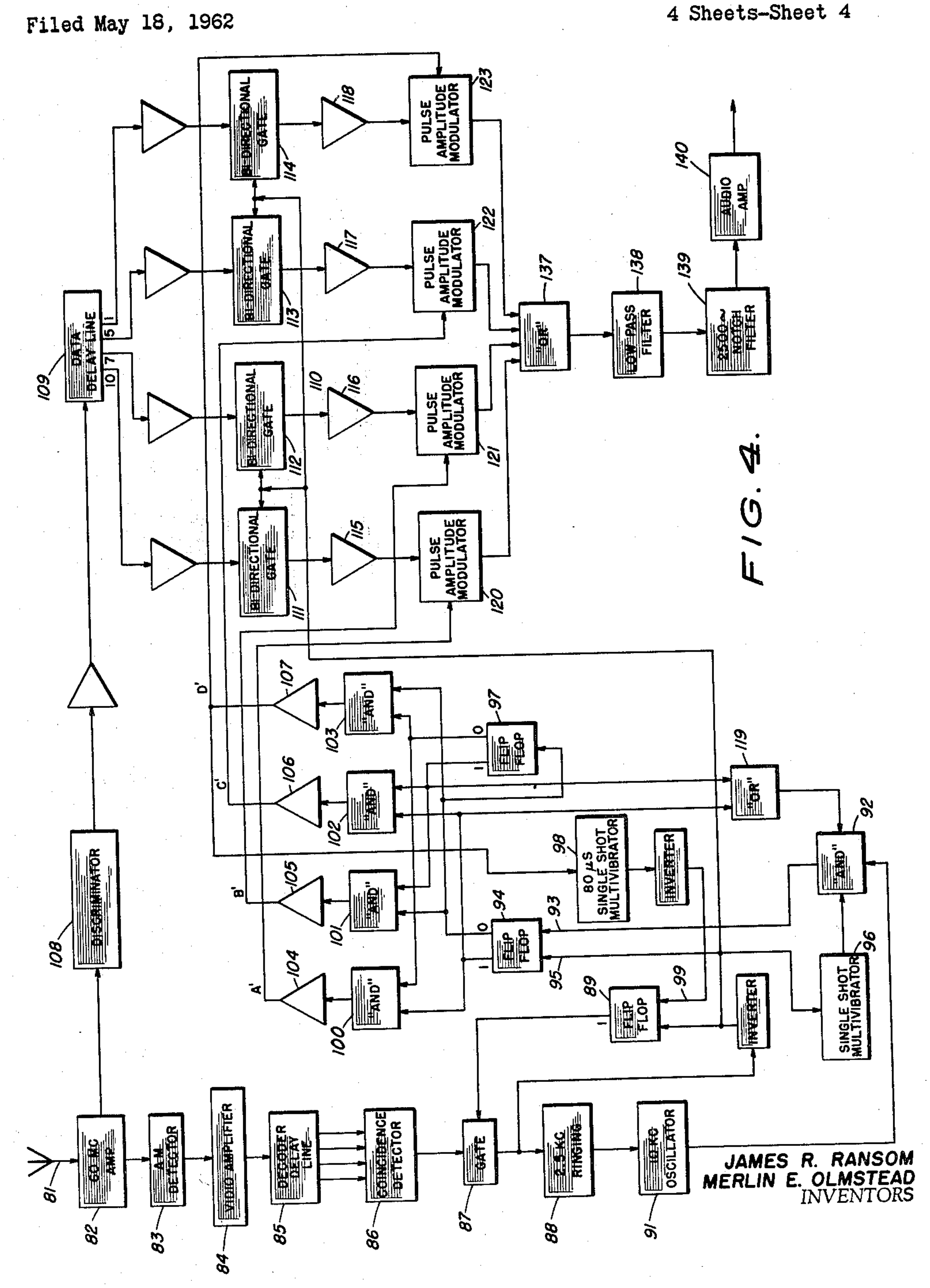
FIG. 4 is a functional block diagram of a receiver operating in accordance with the invention.

FIG. 4 is a block diagram of the receiver. The signal coming from the receiving antenna 81 is amplified in a sixty mc./s. amplifier 82 and applied to an amplitude modulation detector 83 which recovers the modulation envelope of the signal. The sixty mc./s. amplifier has been shown merely to simplify the invention. In practice it would ordinarily be replaced by a superheterodyne circuit including means for converting to and amplifying at some convenient intermediate frequency. The output of the intermediate frequency amplifier would then be utilized in the same manner as that about to be disclosed for the output of amplifier 82.

A video frequency amplifier 84 follows detector 83 and feeds a tapped decoder delay line 85. The taps on delay line 85 are spaced at intervals complementary to the taps of the transmitter delay line 58, as noted during the discussion of FIG. 2B. Upon the application of a correct pulse group a pulse will be present at each of the taps of delay line 85, thereby actuating a coincidence detector 86 which produces a single output pulse. Pulses from detector 86 occur once for every four pulse group received, or at a frequency of 2500 pulses/second. These pulses will be referred to hereinafter as P pulses. Detector 86 is connected through a normally open gate to a 2.5 kc./s. ringing circuit 88. The output of gate 87 is inverted and applied as a trigger to a flip-flop 89. When thus triggered flip-flop 89 disables or closes gate 87. As will later be shown, means are provided for resetting flip-flop 89 so that gate 87 will be reopened after the lapse of 380 microseconds. This insures that only pulses from detector 86 which are periodic with a frequency of approximately 2.5 kc./s. will pass gate 87 and prevents occasional spurious pulses formed of chance combinations of pulses from introducing errors in the receiver storage circuits. Further reduction in errors is made possible by the ringing circuit 88 which requires about twenty consecutive P pulses to build up a useful output. The output of ringing circuit 88 is used to lock a ten kc./s. oscillator 91 into harmonic synchronization therewith, so that there will be available in the receiver a source of ten kc./s. pulses which is accurately synchronized with the ten kc./s. pulse generator 22 of the transmitter. Pulses from oscillator 91 are applied to an "and" gate 92 which possesses two other normally enabling inputs permitting pulses to pass to the clock input line 93 of a counter flip-flop 94. Flip-flop 94 receives inverted P pulses from gate 87 on a "one" reset line 95. P pulses on line 95 also trigger a 40 microsecond single-shot multivibrator 96 which disables "and" gate 92 for that period. It is desired for the reconstruction of the audio signal that flip-flop 94 will maintain either a "0" or a "1" state for approximately 100 microseconds. It is possible for oscillator 91 to be synchronized with the P pulses but nevertheless running with a slight phase displacement or fixed delay. But for the action of multivibrator 96, a pulse from oscillator 91 slightly delayed from the P pulse on line 95 would cause flip-flop 94 to change to "0" after only a few microseconds, rather than after the lapse of 100 microseconds. The P pulse, however, simultaneously with setting flip-flop 94 to a "1" state, triggers multivibrator 96 thereby disabling gate 92 for forty microseconds. This guarantees that flip-flop 94 will remain in the "1" state set by the P pulse on line 95 for at least forty microseconds. Oscillator 91 will generally produce pulses more closely phased with the P pulses than the forty microseconds tolerance permitted by the foregoing arrangement. It may be assumed for the present purpose that no delay exits between the occurrence of a P pulse and the generation of a pulse by oscillator 91. Then, 100 microseconds after the P pulse, a pulse from oscillator 91 will appear on clock line 93 causing flip-flop 94 to change to "0." The "0" output from flip-flop 94 is applied as the clock pulse to a second flip-flop 97, changing initial "0" state to a "1." 200 microseconds after the P pulse, another pulse from oscillator 91 appears on line 93, setting flip-flop 94 to "1." At 300 microseconds flip-flop 94 is again caused to change state. At 400 microseconds another P pulse appears and the cycle is repeated. Four "and" gates 100–103 are connected so as to be enabled by counts from flip-flops 94 and 97 as follows:

| Flip-flop 94 | Flip-flop 97 | |
|---|---|---|
| "1" | "0" | Gate 100 enabled |
| "0" | "1" | Gate 101 enabled |
| "1" | "1" | Gate 102 enabled |
| "0" | "0" | Gate 103 enabled |

An "or" gate 119 receives two inputs from the "1" lines of flip-flops 94 and 97. Gate 119 thus provides an enabling input to "and" gate 92 for any count in flip-flops 94 and 97, except the count of "0"—"0." When the count of "0"—"0" is reached, oscillator 91 can advance the flip-flops 94 and 97 no further. Flip-flop 94 can be advanced to the count of "1" only by the appearance of a P pulse on line 95, following which an enabling output from gate 92 appears and oscillator 91 advances the flip-flops through the next three counts. This guarantees that gates 100–103 will be enabled in proper sequence commencing with gate 100 upon the appearance of a P pulse.

The outputs of gates 100–103 taken from isolation amplifiers 104–107 are 100 microsecond pulses A′–D′ occurring sequentially in the order in which the gates are enabled. The leading edge of the D′ pulse occurs 300 microseconds after the leading edge of the A′ pulse. The D′ pulse leading edge triggers an eighty microsecond single-shot multivibrator 98. The trailing edge of the eighty microsecond pulse from multivibrator is applied to a reset input line 99 on flip-flop 89 triggering that device to zero output and opening gate 87. Thus gate 87 is reopened 380 microseconds after the passage of a P pulse in anticipation of the next P pulse. When the amplitude of the pulses A′–D′ is modulated in accordance with the transmitted samples of the audio signal and the pulses are then combined, a continuous signal results having the appearance of a staircase varying in amplitude corresponding to the original continuous audio signal. It is only necessary to smooth the staircase-like signal by a suitable filter to reproduce substantially the original audio signal. The means for modulating the pulses A′–D′ will next be described.

Returning to the sixty mc./s. amplifier 82, an FM discriminator 108 converts the frequency modulated E–H pulses into four variable amplitude pulses E′–H′, thereby reproducing at the receiver the pulse outputs of transmitter modulators 61 and 72–74 (FIG. 1). These pulses are fed into a delay line 109 tapped at intervals complementary to the station address code, similarly to the delay line 85. The first pulse E′ of the group, transmitted with zero delay, travels the full ten microsecond length of the line. The second pulse F′, transmitted with three microseconds delay, travels to the seven microsecond tap, and so forth, until ten microseconds after the commencement of pulse E′, all pulses are standing at the taps of delay line 109 in proper order. Simultaneously a P pulse generated in delay line 85 passes gate 87 to appear on line 110 enabling four bidirectional gates 111–114. Gates 111–114 are identical to the transmitter gates 17–20 disclosed in detail in FIG. 3. Each of the gates 111–114 includes a storage capacitor which accepts and stores one of the pulses E′–H′ from delay line 109. Four high input impedance amplifiers 115–118 connected respectively to gates 111–114 couple the gates to four pulse amplitude modulators 120–123. The modulators are identical to modulators 61 and 72–74 of FIG. 1 and are disclosed in detail in FIG. 5 to which reference will now be made.

Each modulator includes an emitter follower constructed with a PNP type transistor 124. The base 125 of transistor 124 is connected through a biasing network of resistors 126, 127 and a capacitor 128 to a positive voltage source. The transistor is, therefore, normally backward biased so that the output voltage at the emitter 129 is zero. The anodes of two diodes 131, 132 are connected together at the junction 133 of resistors 126 and 127. When so connected the voltage at junction 133 will be that of the most negative source applied to either of the cathodes 134 or 135 of diodes 131 and 132. One of the cathodes, say 134, is connected to one of the amplifiers, say 115, through which the voltage stored in gate 111 is taken.

The A′ pulses from amplifier 104 extend positively from a negative base line and are of greater magnitude than the largest sample to be stored in gate 111. Upon the appearance of an A′ pulse, the voltage at junction 133 rises along with the A′- pulse until the junction voltage is equal to the sample voltage at cathode 134. The junction voltage can then rise no higher. The voltage at emitter 129 is, therefore, determined by the voltage of the sample applied to cathode 134.

Returning to FIG. 4, pulses from modulators 120–123 are keyed in proper sequence by the pulses A′–D′ from amplifiers 104–107. The modulator outputs are assembled in an "or" gate 124 which produces a staircase waveform output, the average value of which is the desired continuous audio signal. A low pass filter 138 produces the average value of the output of gate 137. A 2500 c.p.s. notch filter 139 eliminates any tone of that frequency which might be introduced in the signal by unbalance in the storage and amplifying circuits. Following the filter 139, an audio amplifier 140 amplifies the reconstructed audio signal for utilization in any desired manner.

Figure 6:
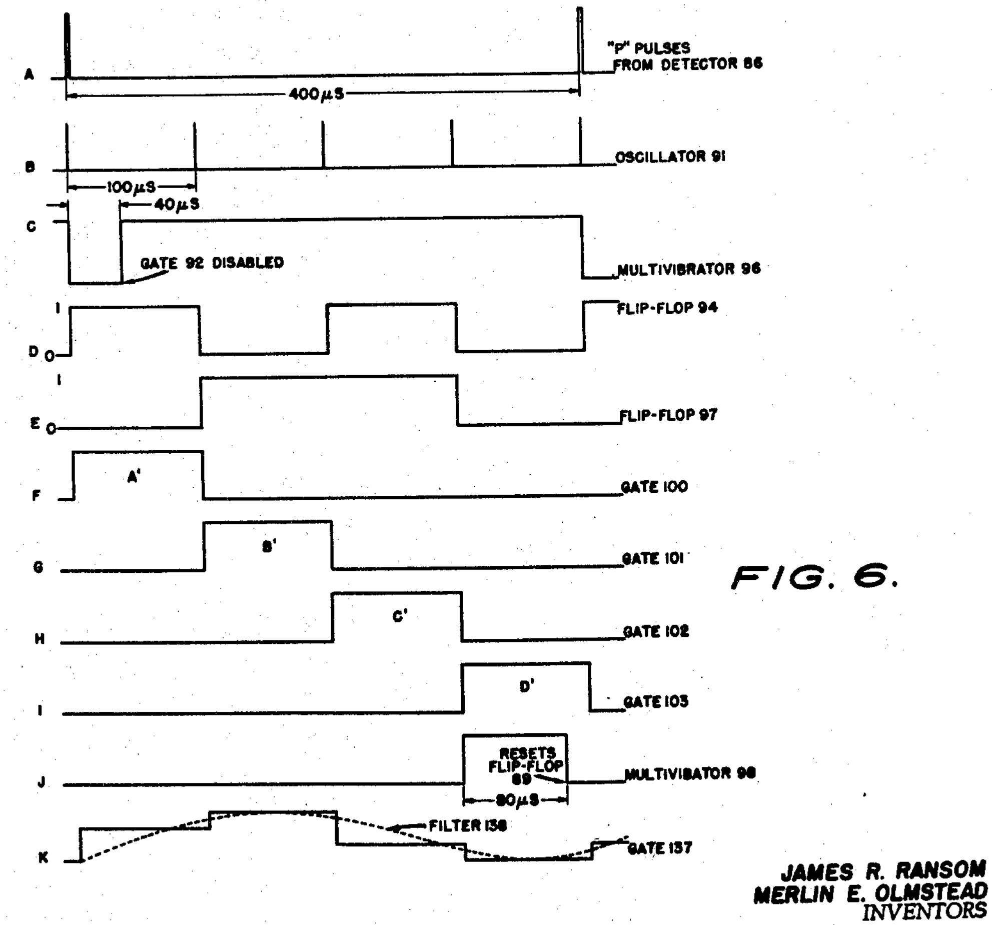
FIG. 6 is a waveform diagram illustrating various operations of the receiver of FIG. 4.

The receiver operation is summarized in the waveform diagrams of FIGS. 6A–K. Coincidence of the four pulse inputs to detector 86 produces a one microsecond P pulse once every 400 microseconds, as shown in FIG. 6A. Oscillator 91 is synchronized with the P pulses to produce pulses at 100 microsecond intervals (FIG. 6B). Each of the P pulses triggers the forty microsecond multivibrator 96 which disables gate 92 for that period (FIG. 6C). The P pulses also cause flip-flop 94 to change from a "zero" to a "one" state, with the next three pulses from oscillator 91 causing alternation (FIG. 6D). Each "zero" going pulse from flip-flop 94 triggers flip-flop 97 (FIG. 6E) causing the latter to alternate at half the frequency of the former. Combinations of the states of flip-flops 94 and 97 actuate "and" gates 100–103 in the sequence appearing in FIGS. 6F–I. The leading edge of the D′ pulse from gate 103 triggers multivibrator 98 (FIG. 6J), which after eighty microseconds resets flip-flop 89 to reopen gate 87. The combined output of modulators 120–123 is shown in FIG. 6K as the output of "or" gate 137, with the dashed line therein representing the reconstructed audio signal from filter 138.

While the invention has been disclosed with reference to specific frequencies and address codes, many variations will be evident within the state of the art. It should, therefore, be understood that the invention may be practiced otherwise than as specifically disclosed while still remaining within the scope of the appended claims.

The invention claimed is:

1. A communications system for transmitting time varying signals from a transmitter to a selected receiver, comprising
- means at the transmitter for regularly sampling the signal, the samples thus provided being of short duration in comparison to the interval separating successive samples;
- means for storing a plurality of said samples in sequence;
- means for retrieving a plurality of said samples from storage in sequence identical to the sequence of storage, said retrieval being accomplished in an interval which is short in comparison to the interval separating successive samples of the signal; and

- means for encoding said retrieved samples to form an address recognizable by the selected receiver.

2. A communications system comprising,
- a transmitter, including means for periodically sampling a signal to be transmitted;
- means for assembling a plurality of the signal specimens provided by said sampling means;
- means for arranging said assembled specimens in a form which is unchanged for successive assemblages of the signal specimens; and
- means for transmitting the assembled and arranged specimens within an interval shorter than the period separating successive samples of the signal; and
- a receiver including
- means receiving only signals having the form of arrangement produced by said transmitter;
- means disassembling said received signals to provide individual specimens; and
- means for reconstructing a continuous signal from said individual specimens.

3. A transmitter for a communications system, comprising
- a plurality of gates each of which receives simultaneously a signal to be transmitted, said gates permitting passage of said signal only upon actuation;
- means for actuating said gates in periodic sequence, each of said gates being actuated for an interval short in comparison to the time between actuation of successive gates;
- storage means connected to each of said gates to receive the portions of signal passed thereby;
- means for generating a carrier wave;
- means controlled by the portions of signal contained by said storage means for modulating said carrier wave; and
- means applying said storage means to said modulating means in sequence corresponding to the sequence of actuation of said gates.

4. A radio transmitter comprising
- means receiving an information signal to be transmitted;
- a plurality of gates to which said information signal is applied;
- means for generating periodic timing signals of short duration in comparison to their period;
- counting means receiving said timing signals and actuating said gates in sequence;
- storage means connected to each of said gates to receive and store samples of said information signal obtained in coincidence with said timing signals;
- means for generating a carrier wave; and
- means for modulating said carrier wave in the form of pulses,
- said pulses conveying information of the amplitudes of each of said stored samples within a time shorter than the period of said timing signals.

5. An asynchronous pulse modulation communications system comprising,
- a signal source,
- a plurality of normally closed gates to which signals from said source are applied,
- storage means connected to said gates,
- switching means for momentarily opening said gates in ordered fashion to provide signal samples in said storage means;
- means for generating a plural pulse address encoded waveform;
- means for modulating each pulse of said plural pulse waveform in accordance with separate samples from said storage means;
- means for transmitting said modulated plural pulse waveform;
- means remotely situated from said transmitting means for receiving modulated plural pulse waveforms addressed thereto;

means for demodulating pulses of said received waveform to provide samples at said receiver corresponding to signal samples;

means at said receiver for storing samples from said receiver demodulating means; and means for reconstructing a signal from said receiver stored samples.

6. An asynchronous pulse modulation communications system comprising a transmitter including means for generating a carrier wave;

means for sampling in ordered sequence a signal to be transmitted;

means for generating a plural pulse waveform, said waveform having irregularly time spaced pulses whereby the address of a selected receiving station is encoded;

means for modulating each pulse of said waveform by individual signal samples;

means for modulating said carrier wave by said modulated plural pulse waveform;

a receiver remotely situated from said transmitter for receiving said modulated carrier wave;

a receiver address decoder responsive to a plural pulse waveform having a particular pulse spacing;

means for demodulating said received waves to provide signal samples at said receiver;

means controlled by said decoder for placing received samples in order corresponding to the position said samples occupied in the original signal; and means for reconstructing a signal corresponding to the original signal from said received samples.

7. An asynchronous pulse modulation communications system comprising, a transmitter including a carrier wave generator and a pulse generator, means controlled by pulses from said pulse generator for sampling a signal to be transmitted, means for storing said samples, means receiving selected pulses from said pulse generator and including a multi-tapped delay line for generating a plural pulse waveform, the time required for a pulse to traverse said delay line being less than the time spacing between pulses from said generator;

first modulating means for controlling the individual amplitudes of pulses from said delay line in accordance with individual stored samples;

second modulating means for impressing the output of said first modulating means on the transmitter carrier wave;

means for transmitting the output of said second modulating means;

a receiver including demodulating means, a second multi-tapped delay line having taps positioned with time spacings complementary to the time spacings of the taps of the first mentioned delay line, and a coincidence detector receiving the output of said second delay line;

an oscillator synchronized with the output of said coincidence detector;

means providing from received waves a plural pulse waveform of variable pulse amplitudes corresponding to the output of said first modulating means;

a third multi-tapped delay line receiving the output of said last named means and having characteristics similar to said second delay line;

a gate and storage means connected to each tap of said third delay line, each of said gates being controlled by said coincidence detector; and means controlled by said oscillator for constructing a continuous signal from samples stored at said receiver.

References Cited in the file of this patent

UNITED STATES PATENTS

| | | |
|---|---|---|
| 2,437,707 | Pierce | Mar. 16, 1948 |
| 2,772,399 | Jacobsen | Nov. 27, 1956 |
| 3,059,228 | Beck et al. | Oct. 16, 1962 |